Figure 1:
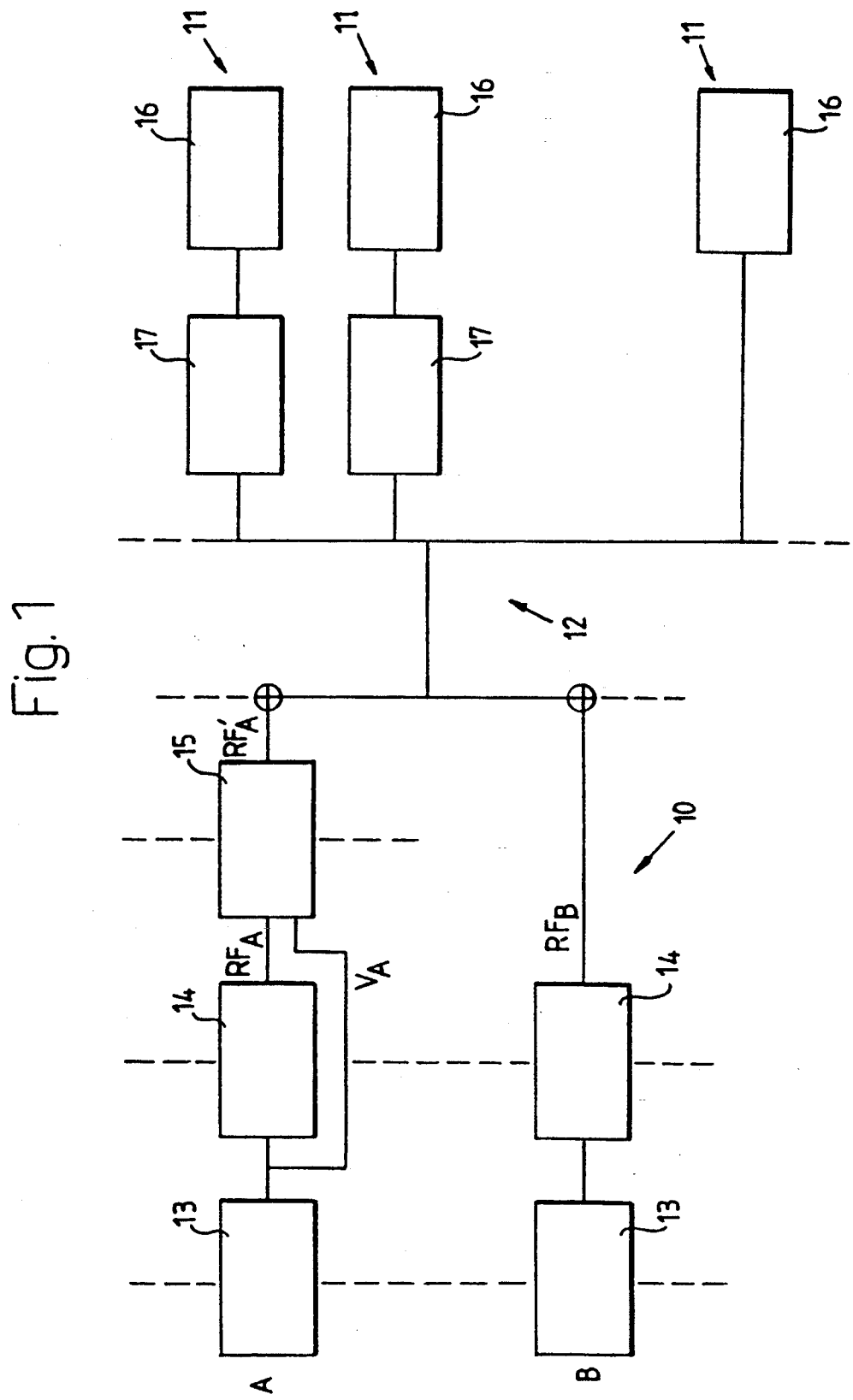

United States Patent [19]
Johansson

[11] Patent Number: 5,450,454
[45] Date of Patent: Sep. 12, 1995

[54] CODING AND DECODING A MODULATED RADIO FREQUENCY SIGNAL

[76] Inventor: Jens J. Johansson, Kastellgatan 19, Göteborg, Sweden, S-413 07

[21] Appl. No.: 211,699
[22] PCT Filed: Oct. 23, 1992
[86] PCT No.: PCT/SE92/00737
§ 371 Date: Jul. 7, 1994
§ 102(e) Date: Jul. 7, 1994
[87] PCT Pub. No.: WO93/08662
PCT Pub. Date: Apr. 29, 1993

[30] Foreign Application Priority Data

Oct. 24, 1991 [SE] Sweden ............................. 9103098

[51] Int. Cl.$^6$ ..................... H04N 7/167; H04B 1/713
[52] U.S. Cl. ........................................ 375/202; 380/10
[58] Field of Search ............... 375/1; 380/9, 10, 20

[56] References Cited

U.S. PATENT DOCUMENTS 3,789,131 1/1974 Harney .............................. 178/5.1
3,885,089 5/1975 Callais et al. ...................... 178/5.1
4,380,743 4/1983 Underhill et al. ................. 331/1 A
4,843,638 6/1989 Walters ............................. 455/318
4,931,749 6/1990 Walters ............................. 331/4

FOREIGN PATENT DOCUMENTS 2071464 9/1981 United Kingdom.
2186156 8/1987 United Kingdom.
2203314 10/1988 United Kingdom.

Primary Examiner—David C. Cain
Attorney, Agent, or Firm—Jacobson, Price, Holman & Stern

[57] ABSTRACT

The invention relates to a method for coding and decoding a radio frequency signal, modulated with a TV program or other message and transmitted from a transmitting center to a plurality of receiver locations, where the coding is effected by shifting, at short intervals, the frequency of each frequency component, contained in the radio frequency signal transmitted from the transmitting center, and decoding is effected by coordinately shifting, at authorized receiver locations, the frequency of each frequency component, contained in the radio frequency signal received at the locations.

10 Claims, 3 Drawing Sheets

CODING AND DECODING A MODULATED RADIO FREQUENCY SIGNAL

The invention relates to the coding and decoding of a modulated radio frequency signal.

More particularly, the invention relates to a method for coding and decoding a radio frequency signal, modulated with a TV program or other message and transmitted from a transmitting center to a plurality of receiver locations, wherein coding is effected by shifting, at short intervals, the frequency of each frequency component, contained in the radio frequency signal transmitted from the transmitting center, and decoding is effected by co-ordinately shifting, at authorized receiver locations, the frequency of each frequency component, contained in the radio frequency signal received at said locations.

Such methods for coding and decoding a radio frequency signal, modualted with a TV program, are previously known through U.S. Pat. No. 3,789,131 and 3,885,089. According to these known methods, coding is performed by bringing the signal transmitted from the transmitting center to switch between two or more fixed TV channels, while decoding is performed by bringing the signal, received at one moment on one of these channels and at the next moment on another channel, to become switched from the respective channels to a channel, on which it is then transmitted to a TV set, provided at the receiver location in question, for use in said set in the same manner as an ordinary program signal, transferred from the transmitting center to the receiver location on a single channel.

As a consequence of the above described switching of the transmitted radio frequency signal between two or possibly more fixed channels, the known methods offer av very poor safety against an unauthorized utilization of the signal coded through frequency shifting. The fact is that it is rather easy to produce a so-called pirate decoder, by which the received signal may be decoded also at unauthorized receiver locations.

The invention has for its purpose to provide an improved coding and decoding method of the kind initially specified, which offers a far better safety against an unauthorized utilization of the transmitted coded signal than does any of the above described known methods. In this connection, it should be emphasized that the invention also aims to provide a coding and decoding method, which may be used not only for coding and decoding a radio frequency signal modulated with a TV program, but also for coding and decoding a radio frequency signal modulated with another type of message, for instance a sound radio program.

The method, in accordance with the invention proposed for the above purpose, is mainly characterized in that the frequency shifts in the transmitted signal are obtained by subjecting a first uncoded radio frequency signal, modulated with the message in question, to mixing with a first unmodulated radio frequency signal, the frequency of which is shifted in accordance with a selected first pattern, and to subsequent filtering in order to form a coded radio frequency signal, modulated with said message, and in that the received radio frequency signal is frequency shifted by being subjected to mixing with a second unmodulated radio frequency signal, the frequency of which is shifted according to a second pattern corresponding to said first pattern, and to subsequent filtering in order to form a second uncoded radio frequency signal, modulated with said message and corresponding to said first uncoded radio frequency signal.

The proposed use of a mixing with an unmodulated radio frequency signal having a variable frequency, both for coding and decoding the signal transmitted from the transmitting center to the receiver locations and modulated with a TV program or other message, makes it possible to execute the frequency shifting of each frequency component contained in said signal in a large number of different steps, having an arbitrary magnitude selected totally independent of any division of the utilized radio frequency band into different channels. This means that coding may be performed according to a very large number of patterns and without any binding whatsoever to certain fixed channels.

Preferably, the transmitted radio frequency signal may be frequency shifted while simultaneously inverting the spectrum of the first modulated uncoded signal, and the received radio frequency signal may be frequency shifted while simultaneously inverting the spectrum of this signal. Hereby, an unauthorized utilization of the signal transmitted from the transmitting center will become still more difficult, since the frequency components contained in said signal will occur in an order reversed in relation to the order in which they would have occurred, had the transmitted radio frequency signal not been coded.

The frequency shifts in the transmitted radio frequency signal should suitably be performed in frequency steps having a magnitude differing from the channel spacing of any standard division of the radio frequency band in question into different channels. Moreover, the received radio frequency signal should suitably be frequency shifted during simultaneous transfer of its spectrum to a selected frequency channel, in order hereby to facilitate an easy utilization of said signal in a receiver provided at an authorized receiver location. This selected frequency channel does not at all need to coincide with the channel on which the modulated uncoded radio frequency signal occurs in the transmitting center before being coded in said center.

The invention also relates to an encoder for use when carrying out the method above described. In accordance with the invention, the proposed encoder is mainly characterized in that it comprises a mixer having a first input for receiving an uncoded radio frequency signal, modulated with a message, and a second input, connected to a local oscillator which is arranged to generate an unmodulated radio frequency signal, the frequency of which may be shifted according to a selected pattern under the control from a control unit, said encoder also comprising a filter, connected to the output of the mixer to remove undesired frequency components from the output signal of the mixer. In practice, such an encoder is easy to realize and may be produced at low costs and, without any substantial difficulty, it may also be installed subsequently in an existing transmission system.

In order to make it possible, in the transmitting center, to generate a coded modulated radio frequency signal having an inverted spectrum, the control unit of the encoder may be arranged to bring the local oscillator to generate a radio frequency signal having a frequency exceeding the frequency of each of the frequency components contained in the uncoded modulated radio frequency signal, and the filter may be arranged to remove, from the output signal of the mixer, the upper side band and the local oscillator frequency and to permit only the lower side band to pass therethrough.

According to a preferred embodiment of the invention, the local oscillator contained in the encoder may suitably be connected in a phase locking loop, controllable from the control unit.

The invention also relates to a decoder for use in carrying out the method according to claim 1. This decoder is mainly characterized in that it comprises a mixer having a first input for receiving a radio frequency signal, modulated with a message and coded through shifting the frequency of each of its frequency components according to a selected first pattern, and a second input, connected to a local oscillator, which is arranged to generate an unmodulated radio frequency signal, having a frequency controllable from a control unit, said control unit being arranged to be supplied with information about said first pattern and to bring the output signal from the local oscillator to shift its frequency according to a second pattern corresponding to said first pattern, the decoder further comprising a filter, connected to the output of the mixer for removing undesired frequency components from the output signal of the mixer. Similarly to the encoder above described, also this decoder has the advantage of having a simple structure and that it may be produced at low costs.

In order to facilitate a reinversion of the frequency spectrum of a received coded modulated radio frequency signal having an inverted spectrum, the control unit may be arranged to bring the local oscillator to generate a radio frequency signal having a frequency exceeding the frequency of each of the frequency components contained in the coded modulated radio frequency signal, and the filter may be arranged to remove, from the output signal of the mixer, the upper side band and the local oscillator frequency and to permit only the lower side band to pass therethrough.

Also in the decoder, the local oscillator may advantageously be connected in a phase locking loop, controllable from the control unit.

Figure 2:
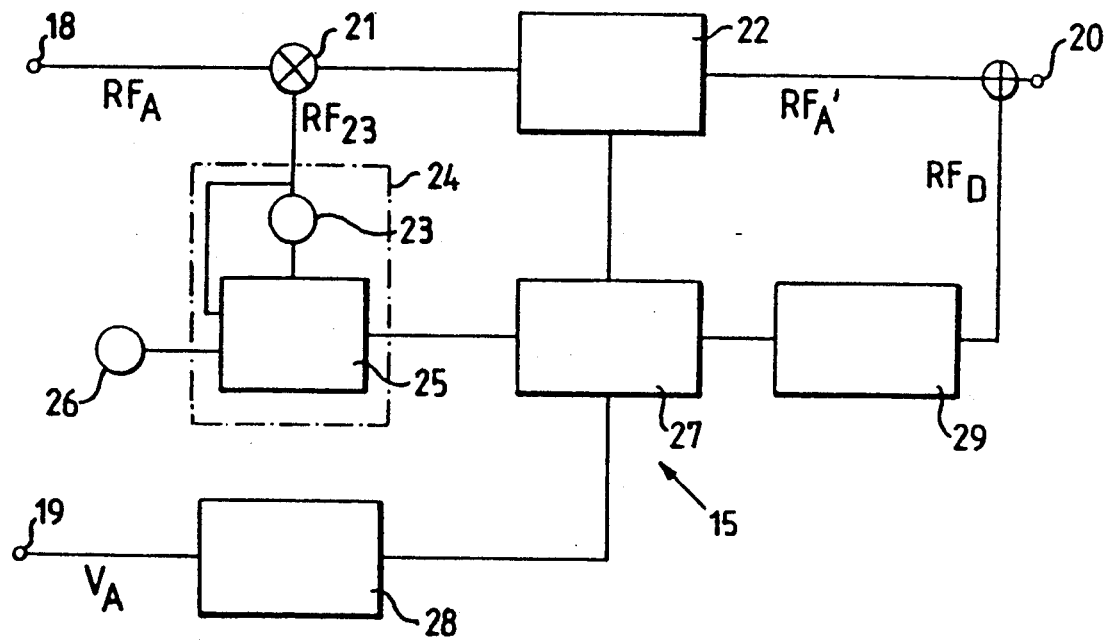
Figure 3:
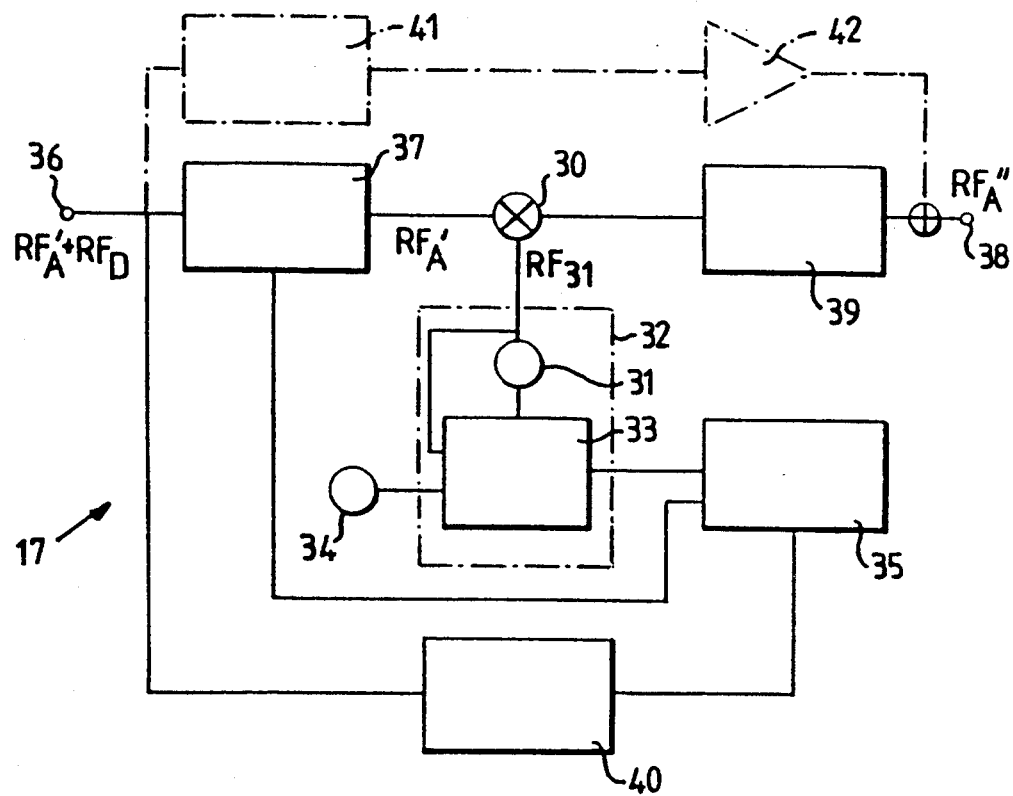
Figure 4:
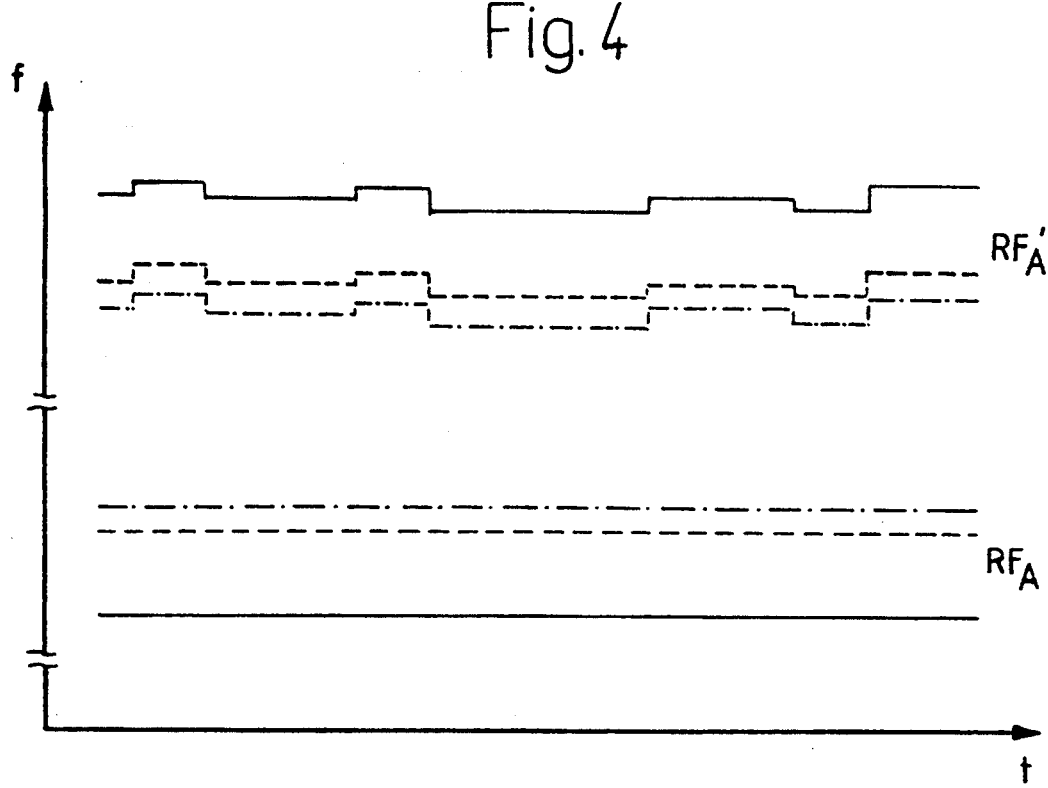
Figure 5:
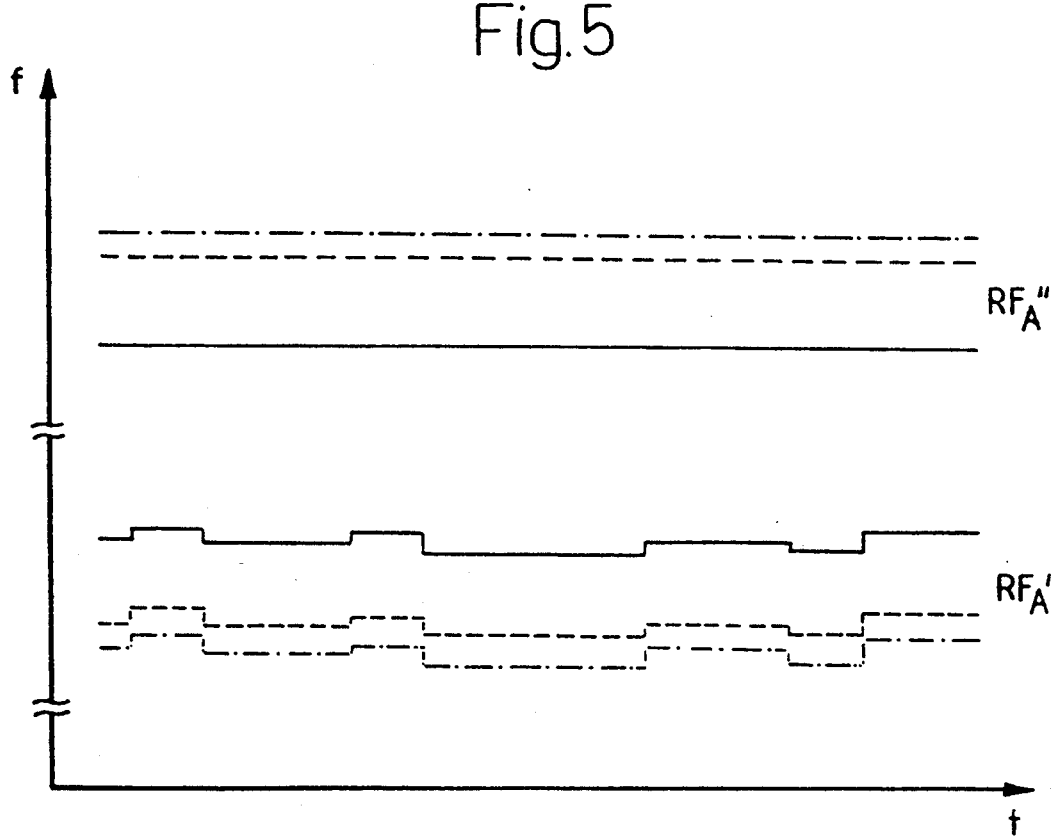

Below the invention is further described with reference to the accompanying drawings which, only by way of example, illustrate one possible application of the proposed method on a cable TV system, in which at least one of the TV programs transmitted from a transmitting center to a plurality of connected receiver locations is transmitted from the transmitting center in a coded state in order hereby to permit a utilization of said program only at receiver locations having a corresponding authorization. In the drawings:

FIG. 1 shows a block diagram of said TV system,

FIG. 2 shows a block diagram of an encoder contained in the transmitting center, FIG. 3 shows a block diagram of a decoder, provided at a receiver location, FIG. 4 is a frequency diagram, illustrating how a TV program, intended to be transmitted from the transmitting center, may be coded by means of the encoder, and FIG. 5 is a frequency diagram, illustrating how a received coded TV program may be decoded by means of the decoder.

In FIG. 1, reference numeral 10 generally designates a transmitting center, while reference numeral 11 generally designates a number of receiver locations, connected to said transmitting center through a cable network 12.

Transmitting center 10 comprises a number of satellite receivers 13, each serving to receive a radio frequency signal modulated with an appurtenant TV program. In each receiver 13, the signal received by said receiver is demodulated to the base band, i.e. to video level. The demodulated TV signal is fed to a modulator 14 which generates an uncoded radio frequency signal, modulated with the TV program in question.

In FIG. 1 only two different channels A and B have been shown, each containing one satellite receiver 13 and one modulator 14. However, by dashed lines it has been indicated that the number of channels may be substantially higher. Moreover, it has been assumed that the radio frequency signal $RF_A$, generated by modulator 14 of channel A, is to be transmitted as a coded signal $RF_A'$ on network 12, while signal $RF_B$, generated by modulator 14 of channel B, is to be transmitted in an uncoded state on network 12. For this reason, channel A contains an encoder 15, connected between modulator 14 of said channel and network 12, while modulator 14 in channel B is connected directly to network 12, i.e. without the intermediary of any encoder. If additional channels are included in the transmitting center 10, some of these channels may be formed in the same manner as channel A and thus each contain an encoder, while the other channels may be formed in the same manner as channel B, which means that they will not contain any encoder. The more detailed structure and function of encoder 15 will be described below with reference to FIG. 2.

In FIG. 1, only three receiver units 11, connected to network 12, have been shown. However, in practice, the number of receiver units may be very large. Therefore, by dashed lines it has been indicated that further receiver units, in addition to those shown, may be included in the system.

Each receiver unit 11 contains a TV set 16. In the two upper receiver units 11 shown in FIG. 1, TV set 16 is connected to network 12 through a decoder 17, while TV set 16 in the lower receiver unit is connected to network 12 without the intermediary of any decoder.

As will be described more in detail below with reference to FIG. 3, decoder 17 has for its purpose, under certain conditions, to make the receiver unit 11 in question capable of utilizing TV programs, transmitted from transmitting center 10 in the shape of uncoded radio frequency signals, as well as TV programs which are transmitted from the transmitting center in the shape of coded signals. On the other hand, in receiver units lacking a decoder, any utilization of signals transmitted in a coded state cannot occur at all.

FIG. 2 shows a block diagram of encoder 15, contained in channel A of transmitting center 10, said encoder being provided with two input terminals 18 and 19, respectively, and an output terminal 20. Input terminal 18 is connected to modulator 14 of said channel and supplied with the uncoded radio frequency signal $RF_A$ which is generated by said modulator and modulated with a TV program, while input terminal 19 is connected to satellite receiver 13 and supplied with the video signal $V_A$ generated by said receiver. Output terminal 20 is connected to cable network 12.

Encoder 15 contains a mixer 21, one input of which is connected to input terminal 18 and the output of which is connected to the input of a controllable bandpass filter 22, having its output connected to output terminal 20. The other input of mixer 21 is connected to a local oscillator 23, forming part of a phase locking loop 24, containing a phase locking circuit 25. To circuit 25, there is connected a reference frequency source 26 as well as a microprocessor 27, which is arranged to control the frequency of the voltage generated by local oscillator 23 and consisting of an unmodulated radio frequency signal $RF_{23}$.

Moreover, encoder 15 also contains a sync separator 28, which is connected to input terminal 19 in order to separate the vertical sync pulses contained in video signal $V_A$ from said signal and feed them to microprocessor 27 in order to bring the latter to deliver frequency shift orders to circuit 25 during the vertical blanking intervals. Finally, the encoder also comprises a data modulator 29, which is connected between microprocessor 27 and output terminal 20 and which may deliver control data generated in the microprocessor to decoder 17 through network 12, said control data being delivered in the shape of a radio frequency signal $RF_D$, modulated with said data.

Encoder 15 as above described may operate in the following manner. In mixer 21, the modulated uncoded radio frequency signal $RF_A$ received over input terminal 18 is mixed with the unmodulated radio frequency signal $RF_{23}$ from local oscillator 23. Under the control from microprocessor 27, the frequency of the latter signal may be shifted in steps of any suitable varying magnitude during each vertical blanking interval or during only some such intervals, selected in any suitable manner. Provided that the frequency of signal $RF_{23}$ constantly is higher than the frequency of each of the frequency components contained in signal $RF_A$, mixer 21 will deliver an output signal, at each instant containing an upper side band, the frequency spectrum of which corresponds to the frequency spectrum of signal $RF_A$ but is displaced in relation to the latter, as well as a lower side band, the frequency spectrum of which is not only displaced in relation to the frequency spectrum of signal $RF_A$ but also inverted in relation to the latter spectrum.

In bandpass filter 22, which is controllable from microprocessor 27, the upper side band and the local oscillator frequency and the uncoded signal $RF_A$ received on input terminal 18 are removed from the output signal of the mixer. Thus, only the lower side band is permitted to pass through the filter to form the coded modulated signal $RF_A'$ which is transmitted on network 12.

In FIG. 4, there is shown a diagram, schematically illustrating the frequency spectrum of the uncoded signal $RF_A$ and the frequency spectrum of the coded signal $RF_A'$ as a function of time. As may be seen from said diagram, the coding operation may involve frequency shifts of variable magnitude effected at short time intervals as well as a variation of the length of said time intervals.

In FIG. 3, there is shown a block diagram of a decoder 17. As may be seen from said figure, with regard to its general structure, decoder 17 has close points of similarity with encoder 15. Thus, it comprises a mixer 30, a local oscillator 31, which is connected in a phase locking loop 32, containing a phase locking circuit 33, and a reference frequency source 34 and a microprocessor 35. One input of mixer 30 is connected to input terminal 36 of the decoder through a controllable bandpass filter 37, while the other input of the mixer is connected to local oscillator 31. Furthermore, the output of mixer 30 is connected to the output terminal 38 of the decoder through a bandpass filter 39.

Input terminal 36 is connected to cable network 12 to receive signals $RF_A'$ and $RF_D$ transmitted on said network. Between input terminal 36 and microprocessor 35, a data demodulator 40 is connected. Hereby, microprocessor 35 may be supplied with the required control data from microprocessor 27 of encoder 15 to enable it to cause frequency shifts in the signal generated in the local oscillator 31 and consisting of an unmodulated radio frequency signal $RF_{31}$ in synchronism with and in correspondence to the frequency shifts in the frequency of local oscillator 23.

The above described decoder 17 operates in the following manner. The coded modulated signal $RF_A'$ received over input terminal 36 passes through filter 37, the passband of which is shifted concurrently with and in correspondence to the frequency spectrum of signal $RF_A'$ through the action of signal $RF_D$ and microprocessor 35, and is then mixed, in mixer 30, with signal $RF_{31}$, the frequency of which is shifted by microprocessor 35 in steps corresponding to the steps in which the frequency of local oscillator 31 in encoder 15 is shifted.

Provided that the frequency of signal $RF_{31}$ constantly is higher than the frequency of each of the frequency components contained in the spectrum of signals $RF_A'$, in the same manner as mixer 21, mixer 30 will deliver an output signal containing an upper and a lower side band. In bandpass filter 39, the upper side band and the local oscillator frequency are removed. Thus, only the lower side band is permitted to pass through filter 39 to output terminal 38 and then further to the antenna input of the TV set 16 in question.

As illustrated in FIG. 5, the output signal $RF_A''$ from decoder 17 will hereby consist of a decoded modulated radio frequency signal having a reinverted frequency spectrum. However, the frequency spectrum in signal $RF_A''$ may preferably be displaced to another frequency channel than the frequency channel within which said spectrum occurs in the original signal $RF_A$.

Both in FIG. 4 and in FIG. 5, the spectrum in question has been illustrated by three lines, namely a full line, representing the frequency of the picture carrier, a dashed line, representing the frequency of the colour carrier, and a dash-dotted line, representing the frequency of the sound carrier.

Above it has been assumed that coding and decoding is effected through a frequency shifting operation taking place during the vertical blanking interval. Even if this has its obvious advantages, it is however also possible to effect the coding and decoding operations without any synchronization to the vertical sync pulses.

In order to achieve a sufficient coding degree, the steps in which the frequency is shifted in the encoder and decoder, respectively, should preferably amount to at least 50–100 kHz.

In order to permit also the uncoded signal $RF_B$ to pass through decoder 17, as shown in dash-dotted lines in FIG. 3, the decoder may be provided with a shunt branch, connected between input terminal 36 and output terminal 38 and preferably containing a band exclusion filter 41, permitting a signal $RF_B$ and any other uncoded TV program signals transmitted over network 12 to pass therethrough, and possibly also an amplifier 42.

Two or more encoders 15 or decoders 17 of the kind above described may be combined into a single coding or decoding unit, respectively, which may contain a single microprocessor or other control unit, common to all said encoders or decoders, respectively. When coding and decoding more than one transmitted signal, the signals may be coded and decoded in synchronism or in asynchronism with each other.

Finally, it is emphasized that the required programming of the microprocessors does not need to involve any difficulties to a skilled programmer, nor does the required data transmission from the encoder to the decoder offer any problem to an artisan. In this connection, it should also be mentioned that the required enabling signals to the decoders of authorized receiver units may be supplied to said units in any suitable manner previously utilized in known subscription TV systems.

The invention is not restricted to the embodiment above described and shown in the drawings. Instead, many other embodiments are feasible within the scope of the invention. By way of example, it could be mentioned that, if desired, one may abstain from utilizing the above described inversion of the frequency spectrum in the encoder and in the decoder by making use of the upper side band instead of the lower side band in the output signals from the mixers.

I claim:

1. A method for coding and decoding a radio frequency signal, modulated with a TV program or other message and transmitted from a transmitting center to a plurality of receiver locations, wherein coding is effected by shifting, at short intervals, the frequency of each frequency component, contained in the radio frequency signal transmitted from the transmitting center, and decoding is effected by co-ordinately shifting, at authorized receiver locations, the frequency of each frequency component, contained in the radio frequency signal received at said locations, characterized in that the frequency shifts in the transmitted signal are obtained by subjecting a first uncoded radio frequency signal, modulated with the message in question, to mixing with a first unmodulated radio frequency signal, the frequency of which is shifted in accordance with a selected first pattern, and to subsequent filtering in order to form a coded radio frequency signal, modulated with said message, and in that the received radio frequency signal is frequency shifted by being subjected to mixing with a second unmodulated radio frequency signal, the frequency of which is shifted according to a second pattern corresponding to said first pattern, and to subsequent filtering in order to form a second uncoded radio frequency signal, modulated with said message and corresponding to said first uncoded radio frequency signal.

2. A method according to claim 1, characterized in that the transmitted radio frequency signal is frequency shifted while simultaneously inverting the spectrum of the first modulated uncoded signal, and in that the received radio frequency signal is frequency shifted while simultaneously inverting the spectrum of this signal.

3. A method according to claim 1, characterized in that the frequency shifts in the transmitted radio frequency signal are performed in frequency steps having a magnitude deviating from the channel spacing of any standard division of the radio frequency band in question into different channels.

4. A method according to any of claim 1, characterized in that the received radio frequency signal is frequency shifted during simultaneous displacement of its spectrum to a selected frequency channel.

5. An encoder for use in carrying out the method according to claim 1, characterized in that it comprises a mixer (21) having a first input for receiving an uncoded radio frequency signal ($RF_A$), modulated with a message, and a second input, connected to a local oscillator (23) which is arranged to generate an unmodulated radio frequency signal ($RF_{23}$), the frequency of which may be shifted according to a selected pattern under the control from a control unit (27), said encoder (15) also comprising a filter (22), connected to the output of the mixer (21) to remove undesired frequency components from the output signal of the mixer.

6. An encoder according to claim 5, characterized in that the control unit (27) is arranged to bring the local oscillator (23) to generate a radio frequency signal ($RF_{23}$) having a frequency exceeding the frequency of each of the frequency components contained in the uncoded modulated radio frequency signal ($RF_A$), and in that the filter (22) is arranged to remove, from the output signal of the mixer (21), the upper side band and the local oscillator frequency and to permit only the lower side band to pass therethrough.

7. An encoder according to claim 5, characterized in that the local oscillator (23) is connected in a phase locking loop (24), controllable from the control unit (27).

8. A decoder for use in carrying out the method according to claim 1, characterized in that it comprises a mixer (30) having a first input for receiving a radio frequency signal ($RF_A'$), modulated with a message and coded through shifting the frequency of each of its frequency components according to a selected first pattern, and a second input, connected to a local oscillator (31), which is arranged to generate an unmodulated radio frequency signal ($RF_{31}$) having a frequency controllable from a control unit (35), said control unit (35) being arranged to be supplied with information about said first pattern and to bring the output signal ($RF_{31}$) from the local oscillator (31) to shift its frequency according to a second pattern corresponding to said first pattern, the decoder (17) further comprising a filter (39), connected to the output of the mixer (30) for removing undesired frequency components from the output signal of the mixer.

9. A decoder according to claim 8, characterized in that the control unit (35) is arranged to bring the local oscillator (31) to generate a radio frequency signal ($RF_{31}$) having a frequency exceeding the frequency of each of the frequency components contained in the coded modulated radio frequency signal ($RF_A'$), and in that the filter (39) is arranged to remove, from the output signal of the mixer (30), the upper side band and the local oscillator frequency and to permit only the lower side band to pass therethrough.

10. A decoder according to claim 8, characterized in that the local oscillator (31) is connected in a phase locking loop (32) controllable from the control unit (35).

* * * * *